(12) United States Patent
Chae et al.

(10) Patent No.: US 12,560,430 B2
(45) Date of Patent: Feb. 24, 2026

(54) LEVEL SENSOR MODULE AND PORTABLE LEVEL MEASURING APPARATUS

(71) Applicant: SEMES CO., LTD., Cheonan-si (KR)

(72) Inventors: Su Jin Chae, Suwon-si (KR); Sang Min Ha, Hwaseong-si (KR); Dong Ok Ahn, Anyang-si (KR); Ho Hyeong Lee, Hwaseong-si (KR); Yong-Jun Seo, Hwaseong-si (KR); Sang Hyun Son, Busan (KR); Hyeong Jun Cho, Seoul (KR)

(73) Assignee: Semes Co., LTD., Chungcheongnam-do (KR)

( * ) Notice: Subject to any disclaimer, the term of this patent is extended or adjusted under 35 U.S.C. 154(b) by 469 days.

(21) Appl. No.: 18/067,406

(22) Filed: Dec. 16, 2022

(65) Prior Publication Data

US 2023/0204354 A1    Jun. 29, 2023

(30) Foreign Application Priority Data

Dec. 28, 2021    (KR) ........................ 10-2021-0189109
May 10, 2022    (KR) ........................ 10-2022-0057493

(51) Int. Cl.
G01C 9/04        (2006.01)
G01C 9/06        (2006.01)

(52) U.S. Cl.
CPC ................. G01C 9/04 (2013.01); G01C 9/06 (2013.01)

(58) Field of Classification Search
CPC ... G01C 9/04; G01C 9/06; G01C 9/02; G01C 25/00
See application file for complete search history.

(56) References Cited

U.S. PATENT DOCUMENTS 3,988,577 A * 10/1976 Leitner ................... H02P 7/293
                                                                377/2
5,347,476 A *  9/1994 McBean, Sr. .......... G01D 3/022
                                                                73/1.88
(Continued)

FOREIGN PATENT DOCUMENTS

CN          106464285 A      2/2017
JP          H09072739 A      3/1997
(Continued)

OTHER PUBLICATIONS

Korean Office Action dated Jul. 18, 2024 issued in corresponding Korean Patent Application No. 10-2022-0057493.
(Continued)

*Primary Examiner* — Yaritza Guadalupe-McCall
(74) *Attorney, Agent, or Firm* — Harness, Dickey & Pierce, P.L.C.

(57)                ABSTRACT

The inventive concept provides a portable level measuring apparatus. The portable level measuring apparatus includes a sensor module having a sensor unit configured to measure an inclination of a measuring object and a wireless communication unit configured to transmit a measured information which is measured at the sensor unit; and a portable terminal connected to the sensor module through a wireless communication, and which displays the measured information, and wherein the sensor module combines with the portable terminal through a connector and which pairs immediately if separated with the portable terminal.

16 Claims, 9 Drawing Sheets

(56)                    References Cited

U.S. PATENT DOCUMENTS

| | | | | |
|---|---|---|---|---|
| 7,401,741 | B2 * | 7/2008 | Thayer | G07C 5/0858 |
| | | | | 235/492 |
| 7,426,451 | B2 * | 9/2008 | Binder | G01C 15/002 |
| | | | | 702/155 |
| 9,008,987 | B2 * | 4/2015 | Tanabe | G01C 25/005 |
| | | | | 702/92 |
| 9,360,317 | B2 * | 6/2016 | Munroe | H03F 3/087 |
| 10,306,339 | B2 | 5/2019 | Serizawa et al. | |
| 10,452,966 | B2 * | 10/2019 | Kanda | G06K 19/07749 |
| 10,524,592 | B2 * | 1/2020 | Sergyeyenko | A47G 1/24 |
| 11,212,909 | B2 * | 12/2021 | Smith | B25F 5/02 |
| 11,246,432 | B2 * | 2/2022 | Sergyeyenko | A47G 1/24 |
| 11,642,045 | B1 * | 5/2023 | Filipovic | A61B 3/113 |
| | | | | 455/702 |
| 11,930,942 | B2 * | 3/2024 | Sergyeyenko | A47G 1/24 |
| 2004/0239524 | A1 * | 12/2004 | Kobayashi | H04W 52/0283 |
| | | | | 340/870.07 |
| 2006/0031014 | A1 | 2/2006 | Sato et al. | |
| 2010/0273461 | A1 * | 10/2010 | Choi | H04M 1/72403 |
| | | | | 455/414.1 |
| 2016/0153767 | A1 * | 6/2016 | Ihlenfeldt | G01B 5/008 |
| | | | | 33/503 |
| 2020/0212544 | A1 * | 7/2020 | Kwon | H01Q 5/40 |
| 2023/0204354 | A1 * | 6/2023 | Chae | G01C 9/06 |
| | | | | 33/366.11 |
| 2025/0155310 | A1 * | 5/2025 | Lei | G01L 25/00 |

FOREIGN PATENT DOCUMENTS

| | | |
|---|---|---|
| KR | 10-1248390 | 4/2013 |
| KR | 10-2017-0018586 A | 2/2017 |
| KR | 102303919 B1 | 9/2021 |
| KR | 10-2021-0130348 A | 11/2021 |
| TW | 200619597 A | 6/2006 |
| TW | 201025992 A | 7/2010 |
| TW | 201417553 A | 5/2014 |

OTHER PUBLICATIONS

Taiwanese Office Action dated Nov. 8, 2023 issued in corresponding Taiwanese Patent Application No. 11221127620.
Chinese Office Action issued in corresponding Chinese Patent Application 202211699700, dated Jul. 18, 2025.

* cited by examiner

LEVEL SENSOR MODULE AND PORTABLE LEVEL MEASURING APPARATUS

CROSS-REFERENCE TO RELATED APPLICATIONS

This application claims priority under 35 U.S.C. § 119 to Korean Patent Application No. 10-2021-0189109 filed on Dec. 28, 2021 and Korean Patent Application No. 10-2022-0057493 filed on May 10, 2022, in the Korean Intellectual Property Office, the disclosures of which are incorporated by reference herein in their entireties.

BACKGROUND

Embodiments of the inventive concept described herein relate to a leveling sensor unit.

In general, a flatness (leveling) is one of the very important factors in a semiconductor manufacturing facility. In particular, if a facility flatness of an equipment such as a robot transferring a substrate or a stage on which the substrate is placed is distorted, it may affect a flow of a chemical, causing issues such as a temperature imbalance and damage to the substrate.

Conventionally, in order to measure an inclination in the semiconductor manufacturing facility, the inclination is simply measured using an analog or digital method and the measured inclination is inspected.

Specifically, an analog inclination sensor (water drop gauge) displays the inclination using bubbles, and an inclination degree can be known only if a manager directly checks a displacement of the bubbles. Accordingly, it is difficult to accurately digitize, and an error may occur according to a user's gaze. In particular, in spaces which are narrow and which cannot be viewed from above, a mirror is used and therefore a possibility of an error occurring is very high.

A digital inclination sensor shows an inclination value as a digital number value, but it is also difficult to check the inclination value if it is difficult for the manager to directly check the inclination value, such as a small space.

Second, in the case of digital sensors, they have an integral display which is good for digitization and easy to use, but they are difficult to use in narrow spaces, and their weight is heavy, which can cause a generation of an inclination due to the weight of the sensor when measuring the leveling of a transfer robot.

SUMMARY

Embodiments of the inventive concept provide a level sensor module and a portable level measuring apparatus which can manage and monitor by remotely receiving an inclination information.

Embodiments of the inventive concept provide a portable level measuring apparatus which can inspect whether an inclination measurement of a level sensor is normal.

The technical objectives of the inventive concept are not limited to the above-mentioned ones, and the other unmentioned technical objects will become apparent to those skilled in the art from the following description.

The inventive concept provides a level sensor module wirelessly connected to a portable terminal. The level sensor module includes a sensor unit configured to measure an inclination; a wireless communication unit configured to transmit a measured value of the sensor unit; a battery unit configured to supply a power source to the sensor unit and the wireless communication unit; a charging unit configured to provide a charging power from the portable terminal to charge the battery unit; and a control unit configured to control the wireless communication unit to recognize a state in which a supply of the charging power is stopped by a separation of the charging unit from a charging terminal of the portable terminal, and to be wirelessly paired with the portable terminal.

In an embodiment, the control unit controls the wireless communication unit to transfer the measured value which is measured at the sensing unit to the portable terminal after a pairing with the portable terminal.

In an embodiment, the sensor unit, the wireless communication unit, and the control unit are installed at a printed circuit substrate, and the printed circuit substrate is mounted to a top surface of a base plate which has a high flatness.

In an embodiment, the level sensor module further includes a memory unit configured to store the measured value which is measured at the sensor unit, and wherein the control unit controls the memory unit so the measured value which is measured at the sensor unit is stored at the memory unit if a wireless communication with the portable terminal is not working.

In an embodiment, the control unit controls the wireless communication unit to transfer a data stored at the memory unit to the portable terminal, if the wireless communication is resumed with the portable terminal.

The inventive concept provides a portable level measuring apparatus. The portable level measuring apparatus includes a sensor module having a sensor unit configured to measure an inclination of a measuring object and a wireless communication unit configured to transmit a measured information which is measured at the sensor unit; and a portable terminal connected to the sensor module through a wireless communication, and which displays the measured information, and wherein the sensor module combines with the portable terminal through a connector and which pairs immediately if separated with the portable terminal.

In an embodiment, the sensor module includes: a built-in battery unit configured to supply a power source to the sensor unit and the wireless communication unit; a charging unit configured to be provided with a charging power from the portable terminal for charging the built-in battery unit; and a control unit configured to control the wireless communication unit to recognize a state in which a supply of the charging power is stopped by a separation of the charging unit from a charging terminal of the portable terminal, and to be wirelessly paired with the portable terminal.

In an embodiment, the control unit controls the first wireless communication unit to transfer a measured value which is measured at the sensor unit to the portable terminal after a pairing with the portable terminal.

In an embodiment, the sensor unit, the first wireless communication unit, and the control unit are installed at a printed circuit substrate.

In an embodiment, the sensor module further comprises a flattened base substrate which has the printed circuit substrate mounted on a top surface, and is mounted on a measured object.

In an embodiment, the sensor module further comprises a memory unit configured to store the measured value which is measured at the sensor unit, and wherein the control unit controls the memory unit so the measured value which is measured at the sensor unit is stored at the memory unit if a wireless communication with the portable terminal is not working.

In an embodiment, the control unit controls the wireless communication unit to transfer a data stored at the memory unit to the portable terminal, if the wireless communication is resumed with the portable terminal.

In an embodiment, the portable terminal includes: a case; a second wireless communication unit provided within the case and configured to receive a measured data from a first wireless communication unit; and a display unit provided at a top surface of the case and configured to display a measured data provided from the sensor module.

In an embodiment, the portable terminal further comprises a main battery unit configured to supply a power source to each component within the sensor module and the case.

In an embodiment, the portable terminal further includes: an analog level provided at the top surface of the case; and a surface plate provided at a top surface of the case and having a sensor module mounted for checking for an abnormality of the sensor unit.

In an embodiment, the portable terminal further includes an adjusting member for adjusting a horizontality of the surface plate.

In an embodiment, the adjusting member further comprises height adjusting bolts installed at an edge of the surface plate.

The inventive concept provides a portable level measuring apparatus having a level sensor module wirelessly connected to a portable terminal. The level sensor module includes: a sensor unit configured to measure an inclination; a first wireless communication unit configured to transmit a measured data of the sensor unit; a battery unit configured to supply a power source to the sensor unit and the first wireless communication unit; a charging unit configured to be provided with a charging power from the portable terminal to charge the battery unit; and a control unit configured to control the first wireless communication unit to recognize a state in which a supply of the charging power is stopped by a separation of the charging unit from a charging terminal of the portable terminal, and to be wirelessly paired with the portable terminal, and wherein the portable terminal includes: a second wireless communication unit provided within a case and configured to receive a measured data from the first wireless communication unit; a display unit provided at a top surface of the case and configured to display a measured data provided from the sensor module; and an inspection unit configured to check for an abnormality of the sensor unit.

In an embodiment, the level sensor module further comprises a memory for storing a measured value which is measured at the sensor unit, and wherein the control unit controls the wireless communication unit so the measured value which is measured at the sensor unit is transmitted to the portable terminal after a pairing with the portable terminal, and controls the memory unit so the measured value which is measured at the sensor unit is stored at the memory unit if a wireless communication with the portable terminal is not working.

According to an embodiment of the inventive concept, managing and monitoring is possible by remotely receiving an inclination information.

According to an embodiment of the inventive concept, a level sensor module and a portable level measuring apparatus is provided.

According to an embodiment of the inventive concept, a portable level measuring apparatus for inspecting whether an inclination measurement of a level sensor is normal may be provided.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
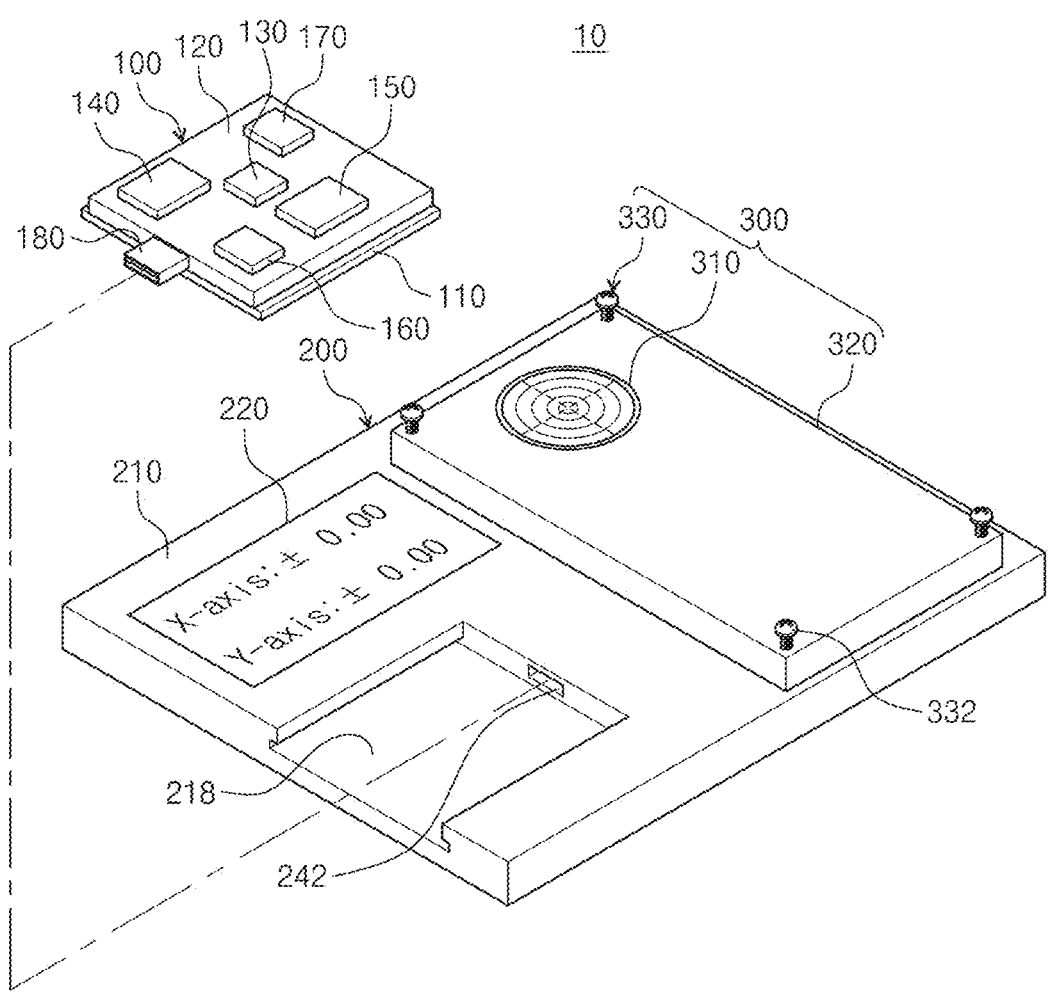
FIG. 1 is a perspective view illustrating a portable level measuring apparatus.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes", and/or "including" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application. In an embodiment of the inventive concept, a portable level measuring apparatus will be described.

Figure 2:
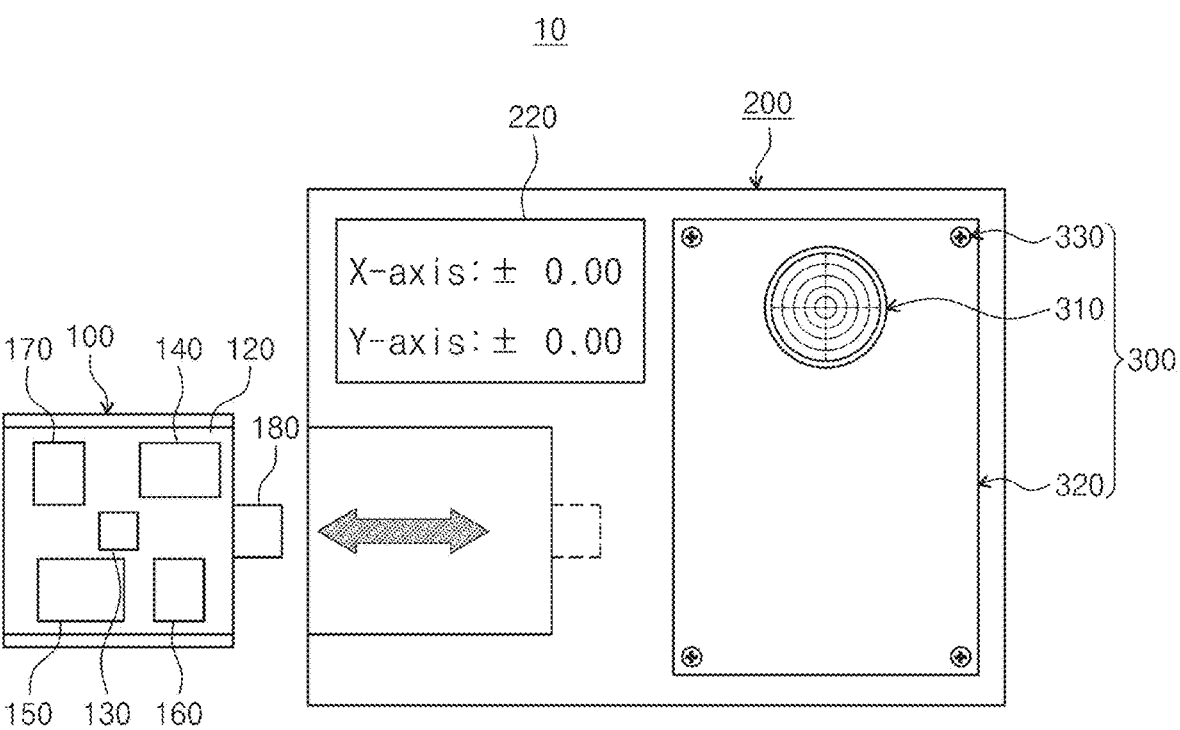
FIG. 2 is a plan view of the portable level measuring apparatus shown in FIG. 1.
Figure 3:
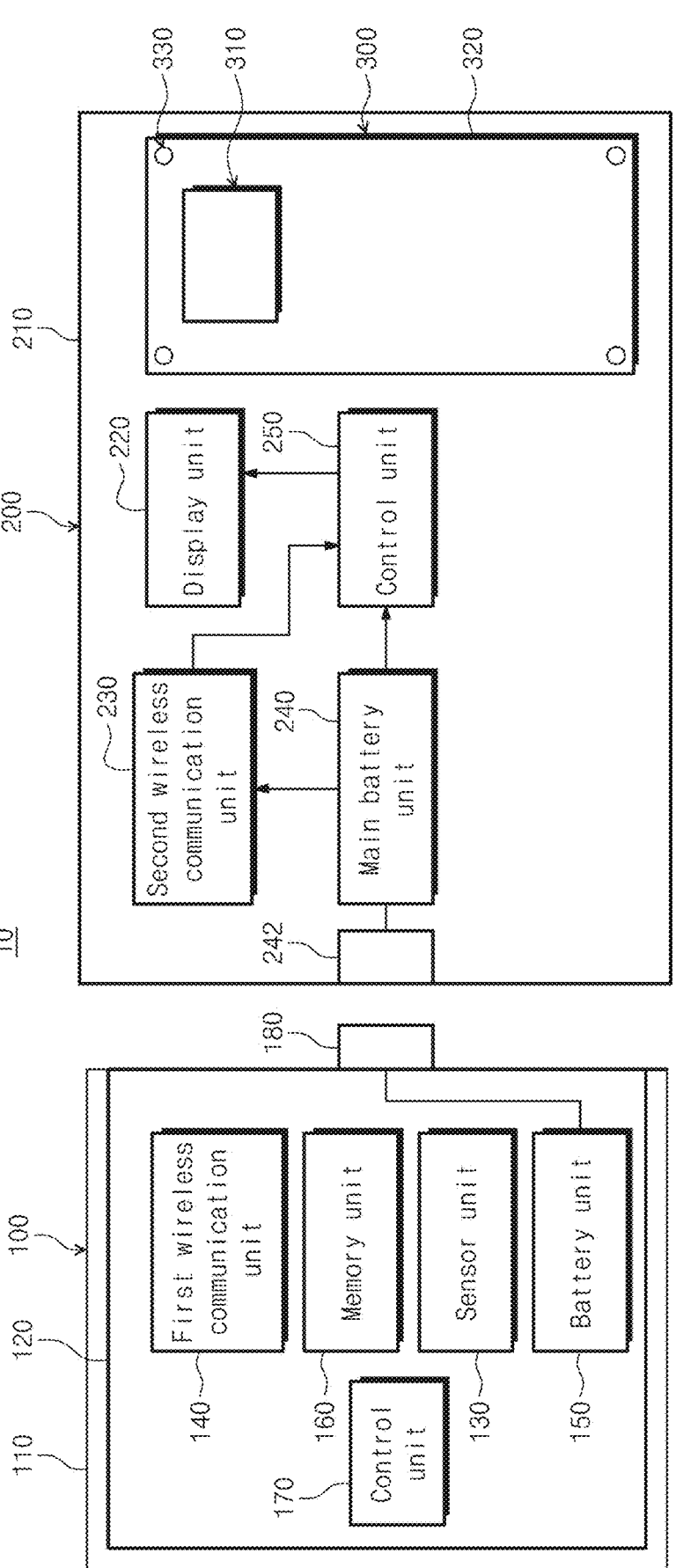
FIG. 3 is a block view of the portable level measuring apparatus shown in FIG. 1.
Figure 4:
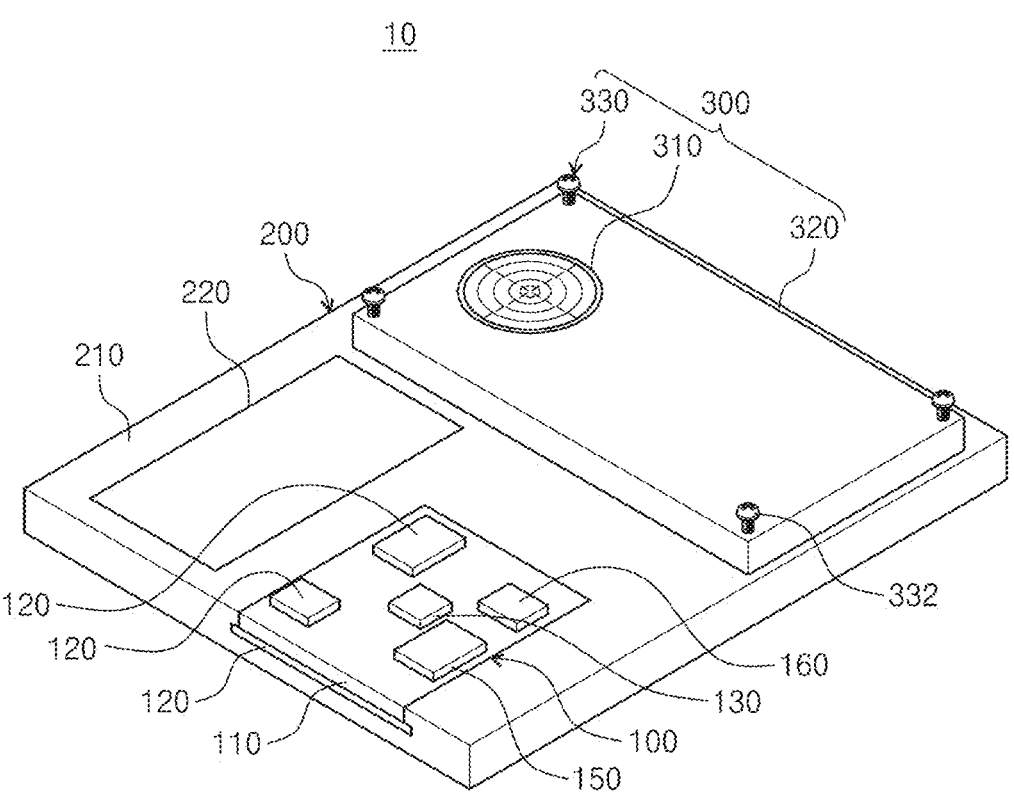
FIG. 4 illustrates a state in which a sensor module is in combination with a portable terminal.

FIG. 1 is a perspective view illustrating a portable level measuring apparatus, FIG. 2 is a plan view of the portable level measuring apparatus shown in FIG. 1, and FIG. 3 is a block view of the portable level measuring apparatus shown in FIG. 1. FIG. 4 illustrates a state in which a sensor module is in combination with the portable terminal.

Referring to FIG. 1 to FIG. 4, the portable level measuring apparatus 10 may include a sensor module 100 and a portable terminal 200.

The sensor module 100 may be provided to be detachable from the portable terminal 200. The sensor module 100 may be separated from the portable terminal 200 and installed on a measurement object which requires an inclination measurement to measure the inclination, and may transmit the measured measurement data through wireless communication. Here, the sensor module may be connected to the portable terminal through a wireless communication and may transmit a measured measurement data in real time. The sensor module 100 is coupled to the portable terminal 200 through a connector, and can be immediately paired and operated if the sensor module 100 is separated from the portable terminal. Also, the sensor module may be configured as a one-click connection, an additional sensor after a sensor scan, and a multiple sensor connection depending on a setting.

According to an embodiment, the sensor module 100 has a base plate 110 having a flat bottom surface. The sensor module 100 includes a sensor unit 130, a first wireless communication unit 140, a battery unit 150, a memory unit 160, a charging unit 180, and a control unit 170. The sensor unit 130, the first wireless communication unit 140, the battery unit 140, the memory unit 160, the charging unit 180, and the control unit 170 may be mounted on a circuit board 120. However, the inventive concept is not limited thereto, and the battery unit 150 may be provided to be electrically connected to the circuit board 120 while being mounted on the base plate 110 without being mounted on the circuit board 120.

The sensor unit 130 may be a level sensor which measures an inclination. The measurement data measured by the sensor unit 130 is transmitted to the portable terminal 200 through the first wireless communication unit 140. The first wireless communication unit 140 may be used by applying one or more methods suitable for use among various short-range communication module methods such as an RF, a WiFi, a Bluetooth, an NFC, and a Zigbee.

The battery unit 150 provides a power required for each component of the sensor module 100. The battery unit 150 may be charged through the charging unit 180. The charging unit 180 receives a charging power from the portable terminal 200.

Although the charging of the battery unit is described using a charging terminal in the inventive concept, the inventive concept is not limited thereto, and various charging methods may be applied to charging the battery unit such as a wireless charging and a USB connection.

The control unit 170 recognizes a state in which the charging unit 180 is separated from the charging terminal 242 of the portable terminal 200 and the charging power supply is stopped, and controls the first wireless communication unit 140 to be wirelessly paired with the portable terminal 200.

After being paired with the portable terminal 200, the sensor module 100 transmits the measurement data measured by the sensor unit 130 to the portable terminal 200 through the first wireless communication unit 140.

The memory unit 160 may store the measurement data measured by the sensor unit 130. If the sensor module 100 and the portable terminal 200 perform a wireless communication normally, the measurement data is not stored in the memory unit 160. If a wireless communication between the sensor module 100 and the portable terminal 200 is interrupted, the control unit 170 controls the memory unit 160 so that the measured data measured by the sensor unit 130 is stored in the memory unit 160. Meanwhile, the control unit 170 controls the first wireless communication unit 140 so that measurement data stored in the memory unit 160 is transmitted to the portable terminal 200 when the wireless communication between the sensor module 100 and the portable terminal 200 is resumed.

The portable terminal 200 may be connected to the sensor module through the wireless communication to receive the measured measurement data and to monitor the received measurement data (inclination information) from a remote location. Since the portable terminal 200 is provided with a display unit for displaying the measured information, it is possible to display the data received from the sensor module on the display unit.

According to an embodiment, the portable terminal 200 may include a case 210, a second wireless communication unit 230, a display unit 220, a main battery unit 240, a control unit 250, and an inspection unit 300. Although not shown, the portable terminal 100 may include an input unit. The input unit may include a plurality of operation buttons, for example, an on/off operation button of the power source, an operation button of the sensor module, and the like.

The display unit 220 is provided on a top surface of the case 210. The display unit 220 may be formed of a panel such as an LCD for displaying the measurement data provided from the sensor module 100.

The second wireless communication unit 230 receives the measurement data from the first wireless communication unit 140. The received measurement data may be provided to the display unit 220 by the control unit 250. Here, the control unit 250 may control the entire operation of the portable terminal. The control unit 250 may include a central processing unit (CPU), a read only memory (ROM), and a random access memory (RAM).

The main battery unit 240 includes a charging battery, is charged by an external power supply, and the power of the battery can be used for charging the sensor module 100. The main battery unit 240 may supply the power to each component in the case 210. The charging terminal 242 may be connected to the main battery unit 240, and the charging terminal 242 may be connected to the charging unit 180 of the sensor module 100.

The inspection unit 300 is a unit for checking whether there is an abnormality with respect the sensor unit 130 of the sensor module 100. The inspection unit 300 may include an analog horizontal system 310 and a surface plate 320. The inspection unit 300 is provided on the top surface of the case 210.

The analog horizontal system 310 is installed on the top surface of the surface plate 320. The analog horizontal system 310 measures an inclination of the top surface of the surface plate 320. A sensor module may be mounted on the surface plate 320. An adjustment member 330 for a horizontal adjustment is provided on the surface plate 320. The adjustment member 330 may include height adjustment bolts 332. The height adjustment bolts 332 may be installed at four corners of the surface plate 320 to adjust inclinations of an X-axis and a Y-axis of the surface plate.

Figure 5A:
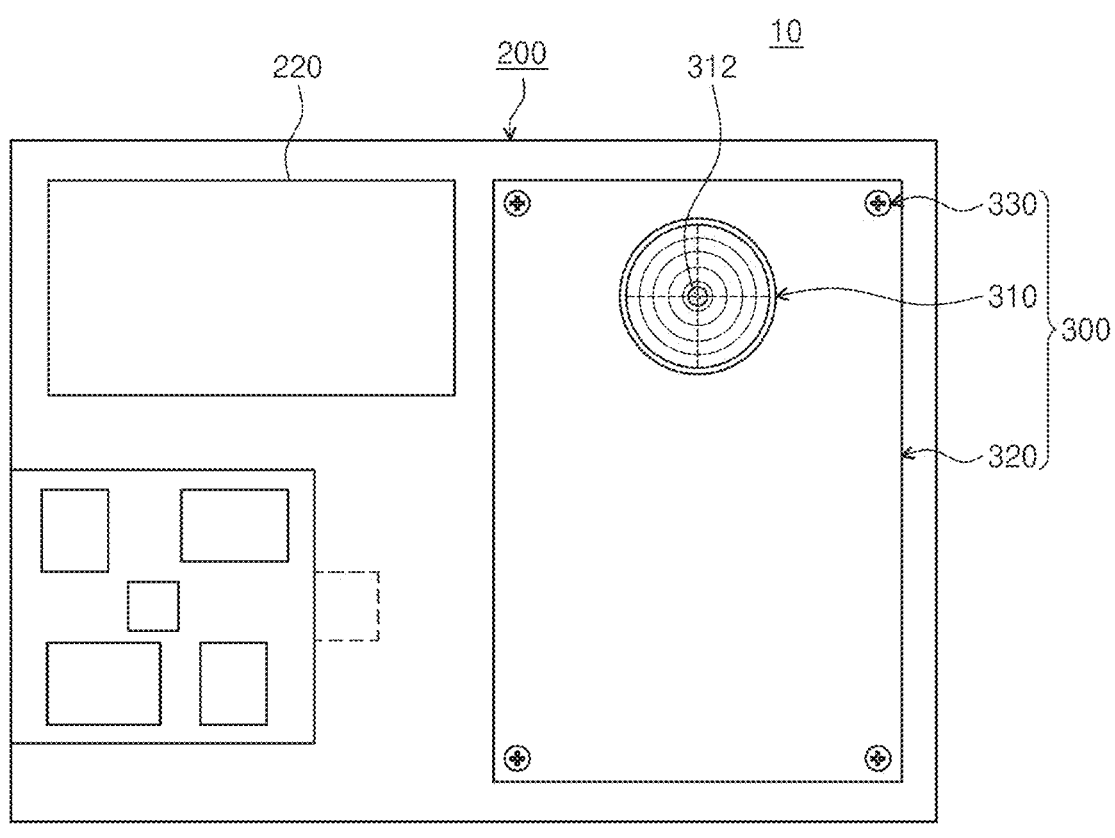
FIG. 5A and FIG. 5B illustrate a process of checking whether a sensor unit is abnormal.
Figure 5B:
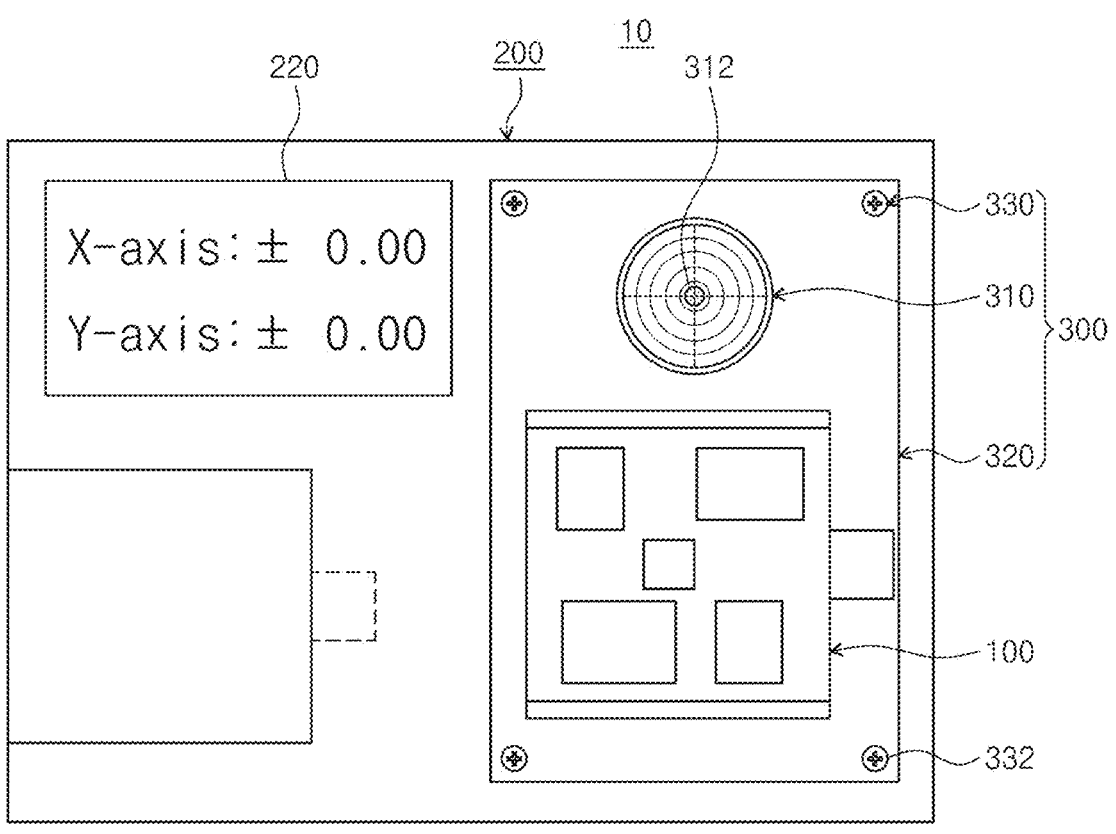

FIG. 5A and FIG. 5B illustrate a process of checking whether the sensor unit has an abnormality.

Referring to FIG. 5A and FIG. 5B, the portable terminal 200 is placed on a flat place, and the analog horizontal system 310 is checked to check a horizontality of the surface 320. If a droplet 312 of the analog horizontal system 310 is located in a center, the sensor module 100 is separated from the portable terminal 200 and placed on the top surface of the surface plate 320. The sensor module 100 measures the inclination of the surface plate 320, and the measured data is provided to the portable terminal 200. The measurement data provided to the portable terminal 200 is displayed on the display unit 220. In this case, the surface plate 320 is in a horizontal state, and both the X-axis inclination and the Y-axis inclination displayed on the display unit 220 are displayed as zero points (0.00). If the X and Y axis inclination values are displayed on the display unit 220 as a value deviating from zero, it may be determined that the sensor unit 130 of the sensor module 100 cannot measure the inclination normally.

As described above, the portable level measuring apparatus 10 of the inventive concept can increase a reliability of the inclination test of the measured object by verifying whether the sensor unit 130 measures the inclination of the measured object normally before measuring the inclination of the measured object.

Figure 6A:
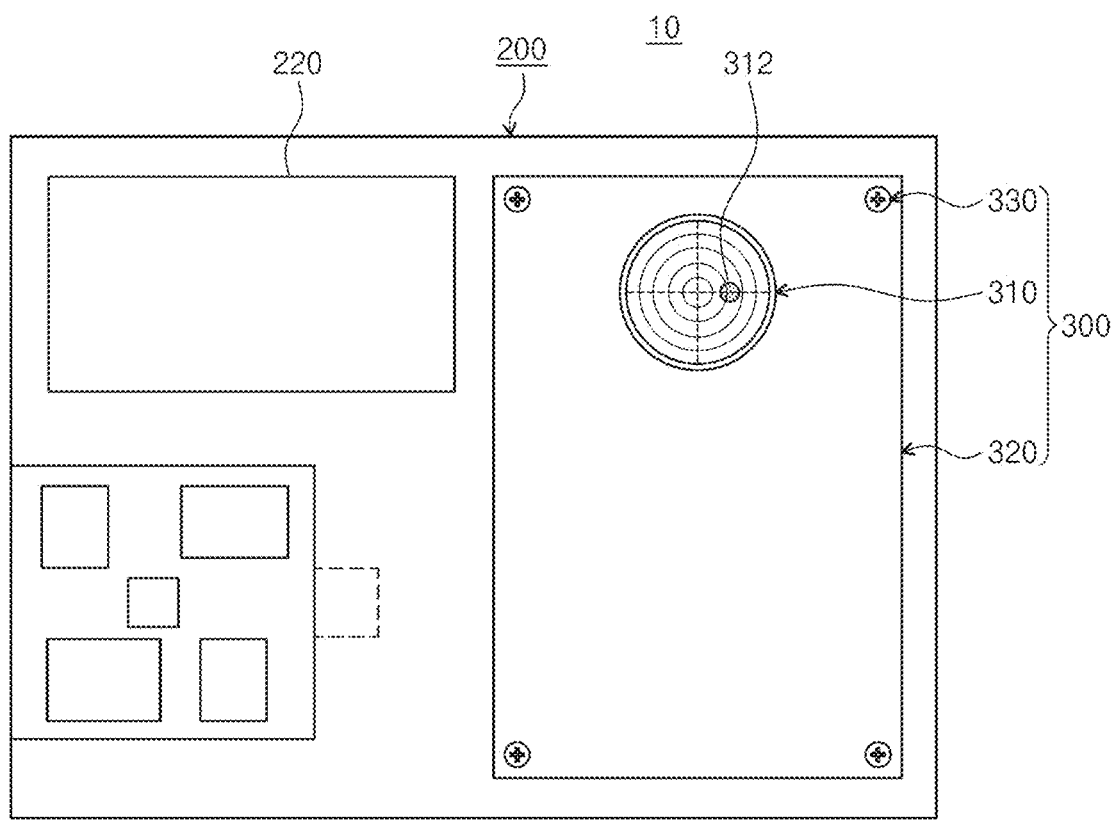
FIG. 6A to FIG. 6C illustrate a process of checking whether the sensor unit is abnormal.
Figure 6B:
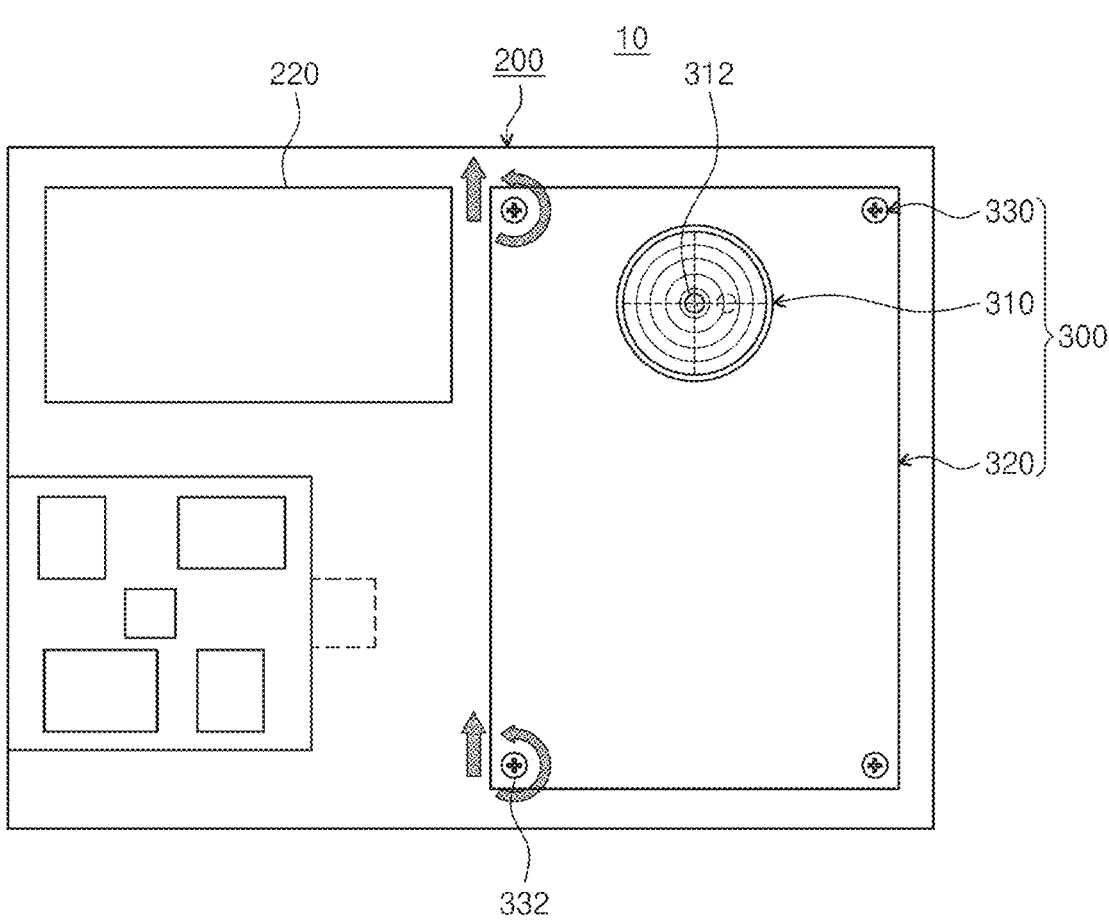
Figure 6C:
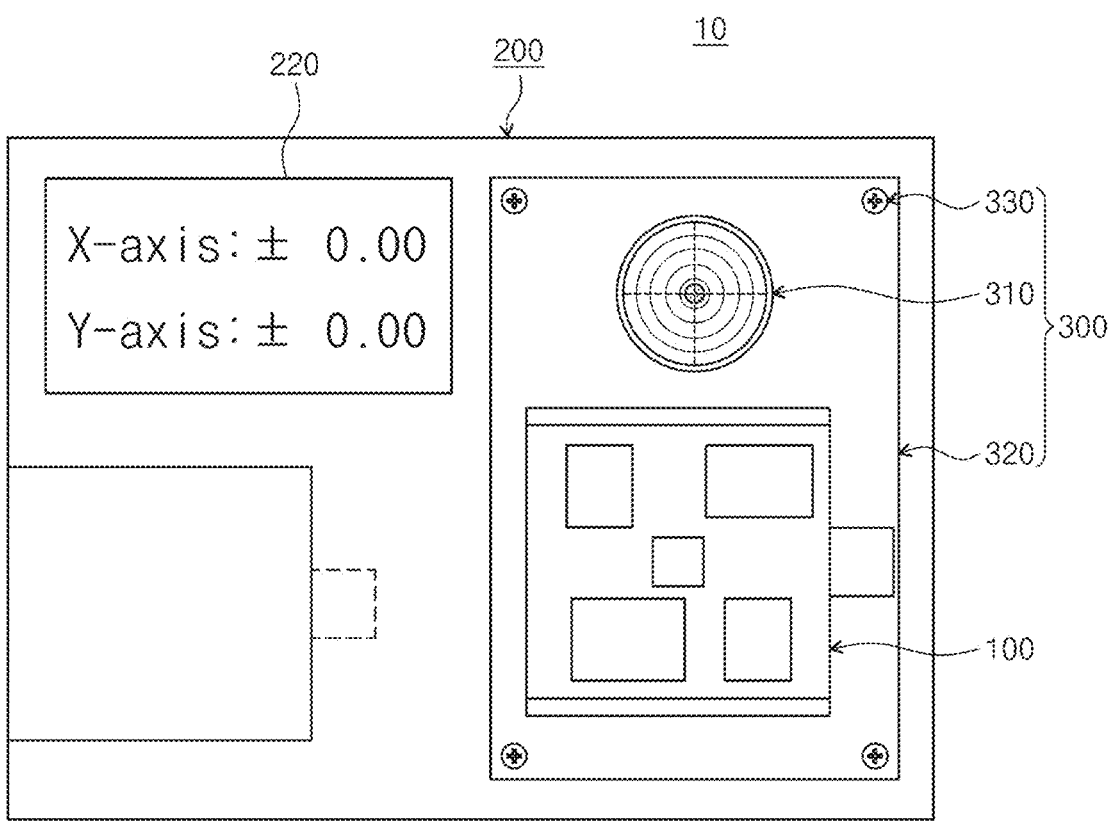

FIG. 6A to FIG. 6C illustrate a process of checking whether the sensor unit has an abnormality.

Referring to FIG. 6A to FIG. 6C, the portable terminal 200 is placed on a flat place, and the analog horizontal system 310 is checked to check the horizontality of the surface 320. If a droplet 312 of the analog horizontal system 310 deviates from the center, a process of leveling the surface plate 320 is performed. That is, the work manager adjusts the horizontal surface plate 320 by manipulating the height adjustment bolts 332 while looking at the analog horizontal system 310. If the horizontal operation of the surface plate 320 is completed, as described above, the sensor module 100 is separated from the portable terminal 200 and placed on the top surface of the surface plate 320 to check for abnormalities in the sensor unit 130. The abnormality check of the sensor unit 130 is the same as described above.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A level sensor module wirelessly connected to a portable terminal comprising:
   a sensor unit configured to measure an inclination;
   a wireless communication unit configured to transmit a measured value of the sensor unit;
   a battery unit configured to supply a power source to the sensor unit and the wireless communication unit;
   a charging unit configured to provide a charging power from the portable terminal to charge the battery unit; and
   a control unit configured to control the wireless communication unit to recognize a state in which a supply of the charging power is stopped by a separation of the charging unit from a charging terminal of the portable terminal, and configured to be wirelessly paired with the portable terminal,
   wherein the sensor unit, the wireless communication unit, and the control unit are on a printed circuit substrate,
   wherein the printed circuit substrate is mounted to a top surface of a base plate which has a high flatness.

2. The level sensor module of claim 1, wherein the control unit is configured to control the wireless communication unit to transfer the measured value that is measured at the sensor unit to the portable terminal after a pairing with the portable terminal.

3. The level sensor module of claim 1, further comprising:
   a memory unit configured to store the measured value that is measured at the sensor unit,
   wherein the control unit is configured to control the memory unit so the measured value that is measured at the sensor unit is stored at the memory unit in response to a wireless communication with the portable terminal not working.

4. The level sensor module of claim 3, wherein the control unit is configured to control the wireless communication unit to transfer a data stored at the memory unit to the portable terminal in response to the wireless communication with the portable terminal being resumed.

5. A portable level measuring apparatus comprising:
   a sensor module having a sensor unit configured to measure an inclination of a measuring object and a first wireless communication unit configured to transmit a measured information that is measured at the sensor unit; and
   a portable terminal connected to the sensor module through a wireless communication, and configured to display the measured information,
   wherein the sensor module is configured to combine with the portable terminal through a connector and immediately pair with the portable terminal in response to being separated from the portable terminal,
   wherein the sensor module includes
      a built-in battery unit configured to supply a power source to the sensor unit and the first wireless communication unit;

a charging unit configured to receive a charging power from the portable terminal for charging the built-in battery unit; and a control unit configured to control the first wireless communication unit to recognize a state in which a supply of the charging power is stopped by a separation of the charging unit from a charging terminal of the portable terminal, and configured to be wirelessly paired with the portable terminal, wherein the sensor unit, the first wireless communication unit, and the control unit are on a printed circuit substrate, and wherein the sensor module further comprises a flattened base substrate which has the printed circuit substrate on a top surface, and the sensor module is on a measured object.

6. The portable level measuring apparatus of claim 5, wherein the control unit is configured to control the first wireless communication unit to transfer a measured value that is measured at the sensor unit to the portable terminal after a pairing with the portable terminal.

7. The portable level measuring apparatus of claim 5, wherein the sensor module further comprises a memory unit configured to store a measured value that is measured at the sensor unit, and wherein the control unit is configured to control the memory unit so the measured value that is measured at the sensor unit is stored at the memory unit in response to a wireless communication with the portable terminal not working.

8. The portable level measuring apparatus of claim 7, wherein the control unit is configured to control the first wireless communication unit to transfer a data stored at the memory unit to the portable terminal in response to the wireless communication with the portable terminal being resumed.

9. The portable level measuring apparatus of claim 5, wherein the portable terminal comprises:

a case;

a second wireless communication unit within the case and configured to receive a measured data from the first wireless communication unit; and a display unit at a top surface of the case and configured to display a measured data received from the sensor module.

10. The portable level measuring apparatus of claim 9, wherein the portable terminal further comprises a main battery unit configured to supply a power source to each component within the sensor module and the case.

11. A portable level measuring apparatus comprising:

a sensor module having a sensor unit configured to measure an inclination of a measuring object and a first wireless communication unit configured to transmit a measured information that is measured at the sensor unit; and a portable terminal connected to the sensor module through a wireless communication, and configured to display the measured information, wherein the sensor module is configured to combine with the portable terminal through a connector and immediately pair with the portable terminal in response to being separated from the portable terminal, and wherein the sensor module comprises:

a built-in battery unit configured to supply a power source to the sensor unit and the first wireless communication unit;

a charging unit configured to receive a charging power from the portable terminal for charging the built-in battery unit; and a control unit configured to control the first wireless communication unit to recognize a state in which a supply of the charging power is stopped by a separation of the charging unit from a charging terminal of the portable terminal, and configured to be wirelessly paired with the portable terminal, wherein the sensor unit, the first wireless communication unit, and the control unit are on a printed circuit substrate, and wherein the portable terminal comprises:

a case;

a second wireless communication unit within the case and configured to receive a measured data from the first wireless communication unit; and a display unit at a top surface of the case and configured to display a measured data received from the sensor module, wherein the portable terminal further comprises:

an analog level at the top surface of the case; and a surface plate at the top surface of the case and having the sensor module configured to check for an abnormality of the sensor unit.

12. The portable level measuring apparatus of claim 11, wherein the portable terminal further includes an adjusting member configured to adjust a horizontality of the surface plate.

13. The portable level measuring apparatus of claim 12, wherein the adjusting member further comprises height adjusting bolts at an edge of the surface plate.

14. A portable level measuring apparatus having a level sensor module wirelessly connected to a portable terminal, the level sensor module comprising:

a sensor unit configured to measure an inclination;

a first wireless communication unit configured to transmit a measured data of the sensor unit;

a battery unit configured to supply a power source to the sensor unit and the first wireless communication unit;

a charging unit configured to receive a charging power from the portable terminal to charge the battery unit; and a control unit configured to control the first wireless communication unit to recognize a state in which a supply of the charging power is stopped by a separation of the charging unit from a charging terminal of the portable terminal, and configured to be wirelessly paired with the portable terminal, wherein the portable terminal includes a second wireless communication unit within a case and configured to receive the measured data from the first wireless communication unit;

a display unit at a top surface of the case and configured to display a measured data provided from the level sensor module; and an inspection unit configured to check for an abnormality of the sensor unit.

15. The portable level measuring apparatus of claim 14, wherein the inspection unit comprises:

an analog level at the top surface of the case; and a surface plate at the top surface of the case and having a sensor module configured to check for the abnormality of the sensor unit; and an adjusting member configured to check for a horizontality of the surface plate through the analog level and configured to adjust the horizontality of the surface plate before the check for the abnormality of the sensor unit.

16. The portable level measuring apparatus of claim 14, wherein the level sensor module further comprises a memory configured to store a measured value that is measured at the sensor unit, and wherein the control unit is configured to control the first wireless communication unit so the measured value that is measured at the sensor unit is transmitted to the portable terminal after a pairing with the portable terminal, and configured to control a memory unit so the measured value that is measured at the sensor unit is stored at the memory unit in response to a wireless communication with the portable terminal not working.

* * * * *